United States Patent [19]

Seitz et al.

[11] 4,283,331
[45] Aug. 11, 1981

[54] AZO DYES, THEIR PREPARATION AND USE

[75] Inventors: Karl Seitz, Oberwil; Dieter Mäusezahl, Biel-Benken, both of Switzerland

[73] Assignee: Ciba-Geigy Corporation, Ardsley, N.Y.

[21] Appl. No.: 5,058

[22] Filed: Jan. 22, 1979

[30] Foreign Application Priority Data

Jan. 25, 1978 [CH] Switzerland ............................ 805/78

[51] Int. Cl.³ ...................... C09B 29/22; C09B 29/36; C09B 31/14
[52] U.S. Cl. .................................... 260/153; 260/154; 260/156; 260/146 R; 260/146 D; 260/146 T
[58] Field of Search ........... 260/153, 154, 156, 146 R, 260/146 D, 146 T

[56] References Cited

U.S. PATENT DOCUMENTS 4,039,523  8/1977  Hegar .................................. 260/196

FOREIGN PATENT DOCUMENTS 1956142 11/1969 Fed. Rep. of Germany ........... 260/156

Primary Examiner—John F. Niebling
Attorney, Agent, or Firm—Edward McC. Roberts

[57] ABSTRACT

Azo dyes of the formula

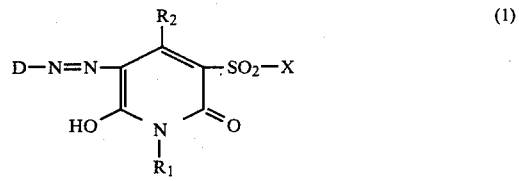

in which D is the sulfo group-containing radical of an aromatic or heterocyclic diazo component, which can be further substituted and itself can contain an azo bridge, $R_1$ and $R_2$ independently of one another are each a hydrogen atom or a substituted or unsubstituted alkyl or aryl radical and X is a substituted or unsubstituted alkyl or alkenyl radical, and their heavy metal complexes, it being possible for the azo dyes of the formula (1) and their heavy metal complexes to contain reactive radicals.

8 Claims, No Drawings

AZO DYES, THEIR PREPARATION AND USE

The present invention relates to azo dyes of the formula

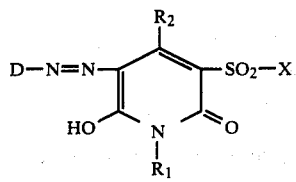

in which D is the sulfo group-containing radical of an aromatic or heterocyclic diazo component, which can be further substituted and itself can contain an azo bridge, $R_1$ and $R_2$ independently of one another are each a hydrogen atom or a substituted or unsubstituted alkyl or aryl radical and X is a substituted or unsubstituted alkyl or alkenyl radical, and their heavy metal complexes, it being possible for the azo dyes of the formula (1) and their heavy metal complexes to contain reactive radicals.

The radical D is an aromatic or heterocyclic radical, which itself can contain an azo group, or a radical which is derived from a compound of the anthraquinone, nitroaryl, phthalocyanine or stilbene series or the like. In particular, D is a radical of the benzene or naphthalene series.

The radical D can contain substituents customary in azo dyes. In particular, the radical D contains sulfonic acid groups. The radical D can contain, for example, the following groups as further substituents, in addition to $SO_3$ groups: alkyl groups having 1 to 4 carbon atoms, such as methyl, ethyl, propyl, isopropyl, butyl, isobutyl, sec.-butyl and tert.-butyl, alkoxy groups having 1 to 4 carbon atoms, such as methoxy, ethoxy, propoxy, isopropoxy, butoxy, isobutoxy, sec.-butoxy and tert.-butoxy, phenoxy, acylamino groups having 1 to 6 carbon atoms, such as acetylamino, propionylamino and benzoylamino, amino groups, such as $—NH_2$, methylamino, ethylamino and phenylamino; carboxylic acid ester groups, such as methoxycarbonyl and ethoxycarbonyl, the nitro, cyano, acetyl, carbamoyl, ureido, hydroxyl and carboxyl groups and halogen, such as fluorine, chlorine and bromine.

If the radical D contains complex-forming groups, such as hydroxyl, carboxyl, amino and sulfo, in the o-position relative to the azo group, the heavy metal complexes of the azo dyes of the formula (I) are also possible.

Complex-forming heavy metals are preferably chromium, cobalt, nickel, copper, iron and manganese.

Alkyl radicals $R_1$ and $R_2$ can be saturated or unsaturated and linear, branched or cyclic. Substituents on the alkyl radicals are, for example: halogen, cyano, thiocyanate, nitro, carbamoyl, sulfamoyl, carboxyl, sulfo, hydroxyl, $—NH_2$, N-alkylamino, N,N-dialkylamino, N-monoalkylcarbamoyl, N,N-dialkylcarbamoyl, N-phenylcarbamoyl, alkoxy, alkoxycarbonyl, cyanoalkoxy, acyloxy, acyl, acylamino, phenyl, naphthyl, phenoxy, naphthoxy and heterocyclic radicals, such as the furan, thiophene or thiazole radical and others.

Aryl radicals $R_1$ and $R_2$ are: phenyl, naphthyl or the radical of diphenyl or stilbene. The aryl radicals can be further substituted, for example by the abovementioned substituents which can be carried by alkyl radicals $R_1$ and $R_2$.

Examples of substituted or unsubstituted alkyl or aryl radicals $R_1$ and $R_2$ are: methyl, ethyl, propyl, isopropyl, butyl, isobutyl, sec.-butyl, tert.-butyl, hexyl, octyl, octadecyl, cyclohexyl, 2-methylcyclohexyl, vinyl, allyl, β-chloroethyl, β-bromoethyl, cyanomethyl, β-cyanoethyl, N-methylaminocarbonylmethyl, N-ethylaminocarbonylmethyl, β-N,N-dimethylaminocarbonylethyl, β-N-propylaminocarbonylethyl, β-N,N-diethylaminocarbonylethyl, γ-N-ethoxypropylaminocarbonylmethyl, γ-N-hexyloxypropylaminocarbonylmethyl, γ-carbamoylpropyl, β-hydroxyethyl, γ-hydroxypropyl, β,γ-dihydroxypropyl, β-hydroxyphenethyl, β-aminoethyl, γ-aminopropyl, 6-aminohexyl, β-N,N-dimethylaminoethyl, β-N,N-diethylaminoethyl, β-isopropylaminoethyl, β-N,N-dipropylaminoethyl, γ-N,N-dimethylaminopropyl, γ-N,N-diethylaminopropyl, γ-(β-hydroxyethylamino)-propyl, methoxymethyl, β-methoxyethyl, γ-methoxypropyl, β-ethoxyethyl, γ-ethoxypropyl, β-propoxyethyl, γ-hexyloxypropyl, γ-isopropoxypropyl, γ-cyclohexyloxypropyl, methoxycarbonylmethyl, ethoxycarbonylmethyl, β-propoxycarbonylethyl, γ-methoxycarbonylpropyl, γ-ethoxycarbonylpropyl, β-(β-cyanoethoxy)ethyl, acetyloxymethyl, β-acetyloxyethyl, β-cyanoacetyloxyethyl, β-butyryloxyethyl, γ-methoxyacetyloxypropyl, β-benzoyloxyethyl, acetylmethyl, β-acetylethyl, γ-benzoylethyl, β-acetylaminoethyl, β-benzoylaminoethyl, benzyl, phenethyl, phenoxyethyl, phenthioethyl, β-methoxycarbonylethylcarbonyl-β-oxethyl, β-benzyloxyethyl, β-butylaminocarbonyloxyethyl, β-ethoxycarbonyloxyethyl, β-phenethyloxyethyl, β-phenylaminocarbonyloxyethyl, β-phenoxycarbonylethyl, β-phenoxycarbonyloxyethyl, β-phenylacetyloxyethyl, β-phenoxyacetyloxyethyl, β-phenylsulfonylethyl, β-phenylsulfonyloxyethyl, β-phenylthioethyl, β-4-methoxycarbonyl-benzoyloxyethyl, β-3-methylbenzoyloxy-ethyl, β-4-methoxy-benzoyloxy-ethyl, β-4-chlorobenzoyloxy-ethyl, β-methylsulfonylaminoethyl, γ-di-(β-hydroxyethyl)-aminopropyl, β-pyridyl-3-carbonyloxy-ethyl, furyl-2-methyl, tetrahydrofuryl-2-methyl, thiazolyl-2-methyl, 1,3-thiazolyl-2-methyl, 3-indolylmethyl, pyridyl-2-methyl, pyridyl-4-methyl, β-pyridyl-2-ethyl, piperidyl-2-methyl, β-piperidyl-1-ethyl, β-piperidyl-2-ethyl, β-piperidyl-4-ethyl, β-piperazinyl-1-ethyl, β-morpholinyl-4-ethyl, β-pyrrolidinyl-1-ethyl, phenyl, 3-methylphenyl, 4-methoxyphenyl, 4-methylthiophenyl, 4-chlorophenyl and 4-aminophenyl.

Alkyl radicals X are straight-chain and branched alkyl radicals, for example methyl, ethyl, propyl, n-butyl and isopropyl. The radical X can be further substituted and in particular X is an alkyl radical which can be substituted by halogen, alkoxy or aryl. In this preferred embodiment halogen substituents are: fluorine, chlorine or bromine, alkoxy substituents are: alkoxy groups which have 1 to 12 carbon atoms and can be straight-chain or branched and aryl substituents are: phenyl and naphthyl. Examples of unsubstituted radicals X are: methyl, ethyl, propyl, isopropyl, butyl, isobutyl, sec.-butyl, tert.-butyl, n-hexyl, cyclohexyl, vinyl and allyl. Examples of substituted radicals X are: chloromethyl, β-chloroethyl, trifluoromethyl, perfluoro-n-butyl, $C_1$–$C_{12}$-alkoxymethyl, benzyl and phenethyl.

Preferably, X is low-molecular alkyl; low-molecular alkyl is to be understood as meaning alkyl radicals having 1 to 6 carbon atoms and especially having 1 to 4 carbon atoms.

The water-soluble azo dyes of the formula (1) can contain one or more than one reactive radical in the molecule.

(Fibre-)reactive radicals are to be understood as meaning those which are able to react with the hydroxyl groups of cellulose or with the amino groups of natural or synthetic polyamides with the formation of covalent chemical bonds.

A reactive radical of this type is, in particular, a low-molecular alkanoyl or alkylsulfonyl radical substituted by a detachable atom or a detachable group, a low-molecular alkenoyl or alkenesulfonyl radical which is unsubstituted or substituted by a detachable atom or a detachable group, a radical which contains carbocyclic or heterocyclic 4-membered, 5-membered or 6-membered rings and is bonded via a carbonyl or sulfonyl group and substituted by a detachable atom or a detachable group, or a triazine or pyrimidine radical which is bonded direct via a carbon atom and substituted by a detachable atom or a detachable group, or contains such a radical.

Preferably, the reactive radical is a six-membered heterocyclic radical which is bonded via an amino group and contains halogen atoms, such as a halogenotriazine or halogenopyrimidine radical, or an aliphatic acyl radical, such as a halogenoacetyl or halogenopropionyl radical.

Preferred azo dyes are those of the formula

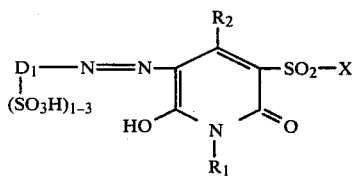

(2)

in which $D_1$ is a benzene or naphthalene radical which can be substituted by methyl, chlorine, nitro, methoxy, ethoxy, phenoxy, hydroxyl, carboxyl, methoxycarbonyl, ethoxycarbonyl, acetyl, acetylamino, benzoylamino and carbamoyl, $R_1$ is a hydrogen atom or an alkyl radical having 1 to 4 carbon atoms, $R_2$ is an alkyl radical having 1 to 4 carbon atoms and X is an alkyl radical having 1 to 4 carbon atoms.

Further preferred azo dyes are those of the formula

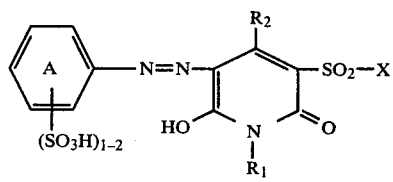

(3)

in which the benzene radical A can be substituted by methyl, chlorine, methoxy, ethoxy, carboxyl, acetyl, acetylamino and benzoylamino, $R_1$ and $R_2$ independently of one another are each an alkyl radical having 1 to 4 carbon atoms and X is an alkyl radical having 1 to 4 carbon atoms, and especially azo dyes of the formula (3) in which $R_1$ is ethyl, $R_2$ is methyl and X is methyl.

Azo dyes of the formula (1) which are of particular interest are those in which D is the radical of a diazo component of the benzene or naphthalene series and in which D contains, as a substituent, a reactive radical which is bonded to a ring carbon atom via a —N(R) bridge, in which R is hydrogen or alkyl having 1 to 4 carbon atoms, a —CH$_2$—NH bridge or

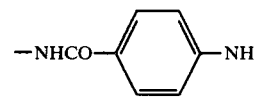

bridge.

Preferred azo dyes are those of the formula

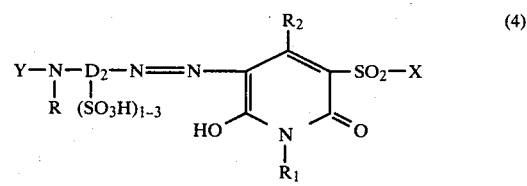

(4)

in which $D_2$ is a benzene or naphthalene radical which can be substituted by methyl, chlorine, methoxy, ethoxy, carboxyl, acetylamino, benzoylamino, —NH$_2$, methylamino, ethylamino, phenylamino or a ureido or hydroxyl group, $R_1$ is a hydrogen atom or an alkyl radical having 1 to 4 carbon atoms, $R_2$ is an alkyl radical having 1 to 4 carbon atoms, X is a substituted or unsubstituted alkyl or alkenyl radical, R is hydrogen or alkyl having 1 to 4 carbon atoms and Y is a reactive radical.

Particularly preferred azo dyes are those of the formula

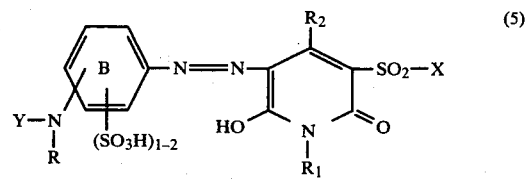

(5)

in which the benzene radical B can be substituted by methyl, chlorine, methoxy, ethoxy, carboxyl, acetylamino, benzoylamino, phenylamino and a ureido group, $R_1$ and $R_2$ independently of one another are each an alkyl radical having 1 to 4 carbon atoms, X is an alkyl radical having 1 to 4 carbon atoms, R is hydrogen or alkyl having 1 to 4 carbon atoms and Y is a reactive radical, and in particular azo dyes of the formula (5) in which $R_1$ is ethyl, $R_2$ is methyl and X is methyl.

Valuable azo dyes are those of the formula

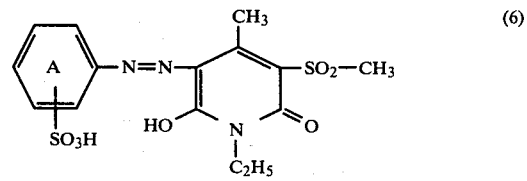

(6)

in which the benzene radical A can be substituted by chlorine, methoxy, carboxyl and benzoylamino, and also those of the formula

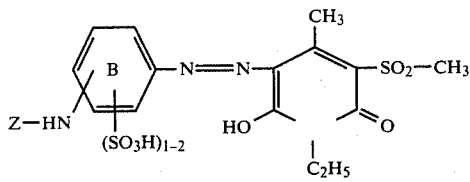
(7)

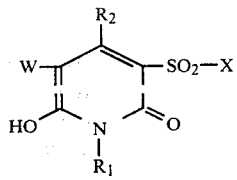
(9)

in which formulae $D_1$, $R_1$, $R_2$ and X are as defined under formula (2) and W is hydrogen or carbamoyl.

The azo dyes of the formula (3) are obtained in an analogous manner by coupling diazotised diazo components of the formula

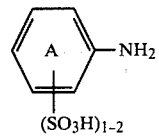
(11)

with coupling components of the formula (9), in which formulae A, $R_1$, $R_2$ and X are as defined under formula (3) and W is hydrogen or carbamoyl. In this case, coupling components of the formula (9) in which $R_1$ is ethyl, $R_2$ is methyl, X is methyl and W is hydrogen or carbamoyl are preferably used as starting materials.

The valuable azo dyes of the formula (6) are prepared by coupling diazotised diazo components of the formula

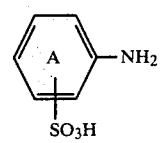
(14)

in which A is as defined under formula (6), with coupling components of the formula

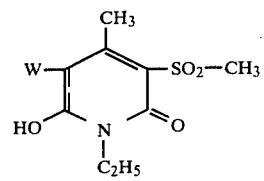
(15)

in which W is hydrogen or carbamoyl.

Azo dyes of the formula (1) which are of particular interest are those which contain a reactive radical in the radical of the diazo component and/or in the radical of the coupling component. Azo compounds of the formula (1) and their heavy metal complexes which contain one or more reactive radicals can be prepared by using diazo and/or coupling components which already contain reactive radicals.

In many cases, however, it is also possible subsequently to introduce reactive radicals into the azo dyes of the formula (1). The introduction can be effected after coupling or after metallisation. The reactive radical is preferably introduced by acylating the diazo components, which, in addition to the amino group to be diazotised, also contain a further acylatable amino group or a group which can be converted, for example in which the benzene radical B can be substituted by methoxy and Z is an α,β-dibromopropionyl radical (in which case the —HN bridge can also be bonded to the benzene radical B via —$CH_2$—) or an α-bromoacryl, 2,6-dichloro-5-methylsulfonyl-pyrimid-4-yl, 2,6-difluoro-5-chloropyrimid-4-yl, 2,4,5-trichloropyrimid-6-yl, 2,4-dichloro-s-triazin-6-yl, 2-chloro-4-amino-s-triazin-6-yl, 2-chloro-4-sulfophenylamino-s-triazin-6-yl, 2-chloro-4-sulfonaphthylamino-s-triazin-6-yl, 2-chloro-4-isopropoxy-s-triazin-6-yl, 2-fluoro-4-sulfophenylamino-s-triazin-6-yl, 2-chloro-4-[4′-(2,4-dichloro-s-triazin-6-ylamino)-3′-sulfophenylamino]-s-triazin-6-yl or 2-chloro-4-[4′-(2-chloro-4-amino-s-triazin-6-ylamino)-3′-sulfophenylamino]-s-triazin-6-yl radical.

The preparation of the azo dyes of the formula (1) comprises coupling diazotised diazo components of the formula

D—$NH_2$ (8)

with coupling components of the formula

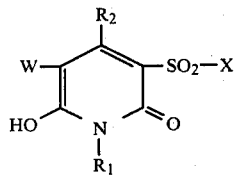
(9)

in which formulae D, $R_1$, $R_2$ and X are as defined under formula (1) and W is hydrogen or carbamoyl, and, if desired, reacting the resulting azo dyes of the formula (1) with heavy metal donors and/or acylating the resulting azo dyes of the formula (1) with acylating agents which contain reactive radicals.

If W in the coupling component of the formula (9) is carbamoyl, the carbamoyl radical W is detached during the coupling according to the process.

The diazo components of the formula (8) which are used are preferably diazo components of the benzene or naphthalene series.

The preferred azo dyes of the formula (2) are obtained by coupling diazotised diazo components of the formula

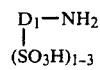
(10)

with coupling components of the formula by reduction or saponification, into an acylatable amino group, such as the nitro group or the acetylamino group, or by acylating the coupling components or, in the case of subsequent introduction, the corresponding aminoazo dyes which contain an acylatable amino group. The starting materials used are preferably diazo components of the benzene or naphthalene series which contain a —N(R)H group, in which R is hydrogen or alkyl having 1 to 4 carbon atoms, or a —CH$_2$—NH$_2$ or

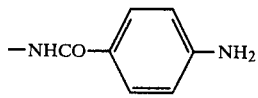

group bonded to a ring carbon atom and these are acylated, before or after the coupling reaction with acylating agents which contain reactive radicals.

The preparation of the azo dyes of the formula (4) comprises subjecting diazo components of the formula

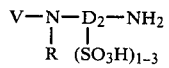 (12)

in which D$_2$ and R are as defined under formula (4) and V is hydrogen or acetyl, to an acylation reaction with acylating agents which introduce the reactive radical Y (if V is acetyl, after detaching the acetyl radical by saponification), a diazotisation reaction and a coupling reaction with coupling components of the formula (9), in which R$_1$, R$_2$ and X are as defined under formula (4) and W is hydrogen or carbamoyl, the acylation being carried out before diazotisation, after diazotisation and before coupling, or after coupling.

The azo dyes of the formula (5) are obtained in an analogous manner by subjecting diazo components of the formula

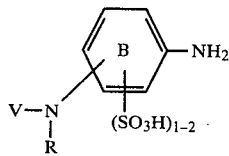 (13)

in which B and R are as defined under formula (5) and V is hydrogen or acetyl, to an acylation reaction with acylating agents which introduce the reactive radical Y (if V is acetyl, after detaching the acetyl radical by saponification), a diazotisation reaction and a coupling reaction with coupling components of the formula (9), in which R$_1$, R$_2$ and X are as defined under formula (5) and W is hydrogen or carbamoyl, the acylation being carried out before diazotisation, after diazotisation and before coupling, or after coupling.

The coupling components of the formula (9) which are used are preferably those in which R$_1$ is ethyl, R$_2$ is methyl, X is methyl and W is hydrogen or carbamoyl.

The process for the preparation of the valuable azo dyes of the formula (7) comprises subjecting diazo components of the formula

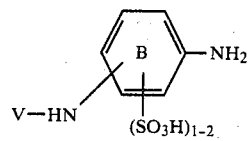 (16)

in which B is as defined under formula (7) and V is hydrogen or acetyl, to an acylation reaction with α,β-dibromopropionyl chloride, α-bromoacryl chloride, 2,4,6-trichloro-5-methylsulfonylpyrimidine, 2,4,6-trifluoro-5-chloro-pyrimidine, 2,4,5,6-tetrachloropyrimidine, 2,4-dichloro-6-isopropoxy-s-triazine, 2,4,6-trichloro-s-triazine and, if desired, ammonia, an aminobenzenesulfonic acid, aminonaphthalenesulfonic acid and/or a diaminobenzenesulfonic acid, or 2,4,6-trifluoro-s-triazine and an aminobenzenesulfonic acid (if V is acetyl, after detaching the acetyl radical by saponification), a diazotisation reaction and a coupling reaction with coupling components of the formula

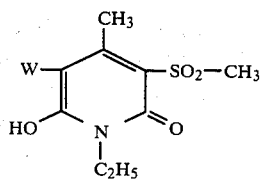 (15)

in which W is hydrogen or carbamoyl, the acylation being carried out before diazotisation, after diazotisation and before coupling, or after coupling.

In the examples which follow the preparation of the intermediates is not described in every case; however, the method used is obvious from what has been stated above.

Starting materials which can be used for the preparation of the azo dyes of the formula (1) are:

Diazo components of the formula (8)

Aniline-2-, -3- and -4-sulfonic acid, aniline-2,5-disulfonic acid, 2,4-dimethylaniline-6-sulfonic acid, 4-chloro-5-methylaniline-2-sulfonic acid, 5-chloro-4-methylaniline-2-sulfonic acid, 3-acetylamino-aniline-6-sulfonic acid, 4-acetylaminoaniline-2-sulfonic acid, 2-chloroaniline-5-sulfonic acid, 4-chloroaniline-2-sulfonic acid, 3,4-dichloroaniline-6-sulfonic acid, 4-methylaniline-2-sulfonic acid, 3-methylaniline-6-sulfonic acid, 2,4-dimethoxyaniline-6-sulfonic acid, 4-methoxyaniline-2-sulfonic acid and 5-methoxyaniline-2-sulfonic acid, 2,5-dichloroaniline-4-sulfonic acid, 2,4-dimethylaniline-5-sulfonic acid, 2-methoxyaniline-4-sulfonic acid, 2-methoxyaniline-5-sulfonic acid, 2-methylaniline-4-sulfonic acid, 4-nitroaniline-2-sulfonic acid, 2-methylaniline-4-sulfonic acid, 4-nitroaniline-2-sulfonic acid, 4-amino-4'-nitrostilbene-2,2'-disulfonic acid, 4-aminostilbene-3,4'-disulfonic acid, 4-ethoxyaniline-2-sulfonic acid, 4-ethylaniline-2-sulfonic acid, 4-ethoxyaniline-3-sulfonic acid, 4-amino-3-methoxy-3'-sulfoazobenzene, 1-amino-3-methyl-4-(4',8'-disulfonaphthyl-2-azo)-benzene, 4-amino-2-acetylaminotoluene-5-sulfonic acid, 4-methoxyaniline-3-sulfonic acid, 1-aminonaphthalene-2-, -4-, -5-, -6-, -7- or -8-sulfonic acid, 2-aminonaphthalene-1-, -5- or -6-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-amino-2-hydroxy-6-nitronaphthalene-4-sulfonic acid, 2-amino-1-hydroxynaphthalene-4,8-disulfonic acid, 6-nitro-1-amino-2-naphthol-4-sulfonic acid, 6-acetylamino-1-amino-2-naphthol-4-sulfonic acid, 4-(2',5'-disulfophenylazo)-2-methoxy-5-methylaniline, 4-(2',5'-disulfophenylazo)-2,5-dimethoxyaniline, 4-(2',5'-disulfophenylazo)-2-methoxy-1-naphthylamino-6-sulfonic, acid 4-(1',5'-disulfonaphth-2'-ylazo)-2,5-dimethoxyaniline, 4-(2',3'- or 4'-sulfophenylazo)-2-methoxyaniline, 4-(2'-, 3'- or 4'-sulfophenylazo)-2-methoxy-5-methylaniline, 4-(2'-, 3'- or 4'-sulfophenylazo)-2,5-dimethoxyaniline, 4-(2',5'- or 3',5'-disulfophenylazo)-2-methoxyaniline, 4-(3',5'-disulfophenylazo)-2-methoxy-5-methylaniline, 4-(3',5'-disulfophenylazo)-2,5-dimethoxyaniline, 4-(2'-carboxy-4'- or -5'-sulfophenylazo)-2-methoxyaniline, 4-(2'-carboxy-4'- or -5'-sulfophenylazo)-2-methoxy-5-methylaniline, 4-(6',8'-disulfonaphth-2'-ylazo)-2-methoxyaniline, 4-(6',8'-disulfonaphth-2'-ylazo)-2-methoxy-5-methoxyaniline, 4-(6',8'-disulfonaphth-2'-ylazo)-2,5-dimethoxyaniline, 2-aminonaphthalene-4-, -7- or -8-sulfonic acid, 2-amino-5-aminomethyl-naphthalene-1-sulfonic acid, 1-amino-3-benzoylamino-benzene-6-sulfonic acid, 1-amino-4-benzoylamino-benzene-6-sulfonic acid, 4- or 5-sulfoanthranilic acid, 1-(3'- or 4'-aminobenzoyl)aminobenzene-3-sulfonic acid, 3-aminopyrene-8- or -10-monosulfonic acid, 3-aminopyrene-5,8- or -5,10-disulfonic acid, dehydrothio-p-toluidinemonosulfonic acid, dehydrothio-p-toluidinedisulfonic acid, 3-amino-6-hydroxy-5-(sulfonic acid)-benzoic acid, 2-amino-4,6-disulfonic acid, 4-acetylamino-2-aminophenol-6-sulfonic acid, 6-chloro-, 6-nitro- or 6-acetylamino-2-aminophenol-4-sulfonic acid, 2-aminophenol-4- or -5-sulfonic acid, 3-amino-2-hydroxy-5-(sulfonic acid)-benzoic acid, 2-aminophenol-4- or -5-sulfonic acid, 4-chloro- or 4-nitro-2-aminophenol-6-sulfonic acid, 1-amino-2-hydroxynaphthalene-4-sulfonic acid, 1-amino-3-chloro-6-(2'-sulfo-4'-chloro-phenoxy)benzene and 1-amino-2-(4'-methoxyphenylsulfonyl)-benzene-5-sulfonic acid.

Diazo components of the formula (8) which are suitable for the introduction of a reactive radical are, for example: 1,3-diaminobenzene-4-sulfonic acid, 1,3-diaminobenzene-4,6-disulfonic acid, 1,4-diaminobenzene-2-sulfonic acid, 1,4-diaminobenzene-2,5- or -2,6-disulfonic acid, 1,3-diamino-4-methylbenzene-6-sulfonic acid and their monoacetyl derivatives, 4-nitro-2-aminophenol-6-sulfonic acid, 6-acetylamino-1-amino-2-naphthol-4-sulfonic acid and 1-amino-4-methoxy-5-aminomethyl-benzene-6-sulfonic acid.

Coupling components of the formula (9)

3-Methylsulfonyl-4-methyl-2,6-dihydroxy-pyridine, 3-ethylsulfonyl-4-methyl-2,6-dihydroxy-pyridine, 1,4-dimethyl-3-methylsulfonyl-6-hydroxy-pyrid-2-one, 1-ethyl-3-methylsulfonyl-4-methyl-6-hydroxy-pyrid-2-one, 1-ethyl-3-methylsulfonyl-4-methyl-5-carbamoyl-6-hydroxy-pyrid-2-one, 1,4-dimethyl-3-methylsulfonyl-5-carbamoyl-6-hydroxy-pyrid-2-one, 1-ethyl-3-ethylsulfonyl-4-methyl-5-carbamoyl-6-hydroxy-pyrid-2-one, 1,4-dimethyl-3-ethylsulfonyl-5-carbamoyl-6-hydroxy-pyrid-2-one, 3-methylsulfonyl-4-methyl-5-carbamoyl-2,6-dihydroxy-pyridine, 3-methylsulfonyl-4-ethyl-2,6-dihydroxy-pyridine, 3-methylsulfonyl-4-ethyl-5-carbamoyl-2,6-dihydroxy-pyridine, 1-cyclohexyl-3-methylsulfonyl-4-methyl-6-hydroxy-pyrid-2-one, 1-n-propyl-3-methylsulfonyl-4-methyl-5-carbamoyl-6-hydroxy-pyrid-2-one, 1-ethyl-3-methylsulfonyl-4-(4'-methoxy-3'-sulfophenyl)-6-hydroxy-pyrid-2-one, 1-ethyl-3-chloromethylsulfonyl-4-methyl-6-hydroxy-pyrid-2-one, 1-ethyl-3-β-chloroethylsulfonyl-4-methyl-6-hydroxy-pyrid-2-one, 1-β-aminoethyl-3-methylsulfonyl-4-methyl-6-hydroxy-pyrid-2-one, 1-β-aminoethyl-3-methylsulfonyl-4-methyl-5-carbamoyl-6-hydroxy-pyrid-2-one, 1-phenyl-3-methylsulfonyl-4-methyl-6-hydroxy-pyrid-2-one, 1-β-hydroxyethyl-3-methylsulfonyl-4-methyl-6-hydroxy-pyrid-2-one, 1-isopropyl-3-methylsulfonyl-4-methyl-6-hydroxy-pyrid-2-one, 1-ethyl-3-γ-chloropropylsulfonyl-4-methyl-6-hydroxy-pyrid-2-one, 1-ethyl-3-δ-chlorobutylsulfonyl-4-methyl-6-hydroxy-pyrid-2-one, 1-ethyl-3-methylsulfonyl-6-hydroxy-pyrid-2-one, 1-ethyl-3-benzylsulfonyl-4-methyl-6-hydroxy-pyrid-2-one, 3-methylsulfonyl-2,6-dihydroxy-pyridine, 3-methylsulfonyl-5-carbamoyl-2,6-dihydroxy-pyridine, 1-butyl-3-methylsulfonyl-4-methyl-6-hydroxypyrid-2-one and 1,4-diethyl-3-methylsulfonyl-6-hydroxypyrid-2-one.

The coupling components of the formula (9) are prepared by reacting compounds of the formula

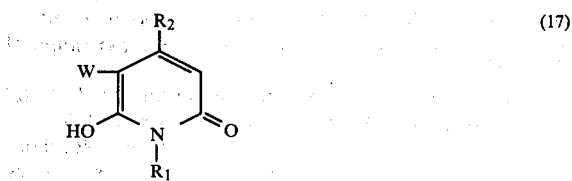

in an aqueous alkaline medium with compounds of the formula

in which formulae (17) and (18) the radicals $R_1$, $R_2$, W and X are as defined under formula (9) and Y is a halogen atom.

The starting materials used are preferably compounds of the formulae (17) and (18) in which $R_1$ is a hydrogen atom or an alkyl radical having 1 to 4 carbon atoms, $R_2$ is an alkyl radical having 1 to 4 carbon atoms, W is a hydrogen atom or a carbamoyl radical, X is a substituted or unsubstituted alkyl or alkenyl radical and Y is a halogen atom.

Further preferred starting materials are compounds of the formulae (17) and (18) in which $R_1$ and $R_2$ independently of one another are each an alkyl radical having 1 to 4 carbon atoms, W is a hydrogen atom or the group $H_2N-CO$, X is an alkyl radical having 1 to 4 carbon atoms and Y is a halogen atom.

Halogen Y is fluorine, chlorine or bromine.

The coupling component of the formula

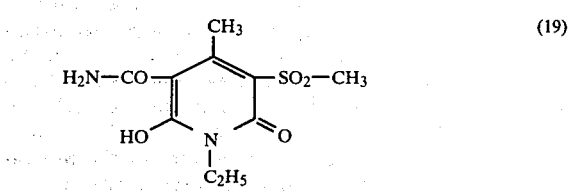

is obtained by reacting a compound of the formula

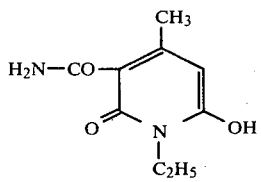

(20)

with methanesulfonyl chloride of the formula

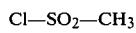

Cl—SO$_2$—CH$_3$  (21)

in an aqueous alkaline medium.

The reaction is preferably carried out in an aqueous medium. However, the reaction can also be carried out in an organic solvent, in a mixture of organic solvents or in a mixture of water and one or more organic solvents. Suitable organic solvents are: dimethylformamide, dimethylsulfoxide, acetic acid and pyridine. The reaction can also be carried out in a two-phase solvent system. Such a system is, in particular, a water/organic solvent system, for example water/methylene chloride or water/toluene.

The reaction is carried out in an alkaline medium. A pH range suitable for this is at values between 8 and 14; preferably, the reaction is carried out in a pH range of 11 to 12.

The alkaline agents used are, as usual, alkali metal hydroxides, carbonates, bicarbonates or acetates, or alkaline earth metal hydroxides, carbonates, bicarbonates or acetates, or organic bases, such as tertiary amines, for example triethylamine, or heterocyclic nitrogen compounds, such as pyridine and others.

In a preferred embodiment, the reaction is carried out in strongly alkaline aqueous solution, the alkali used being, in particular, sodium hydroxide.

In general, the reaction is carried out at temperatures between 0° and 100° C. and preferably a low temperature is chosen, for example between 0° and 20° C.

After the reaction is complete, the compounds of the formula (9) can be salted out, for example by adding sodium chloride. The compound of the formula (9) is then in the form of the monosodium salt and if this is dissolved in water and concentrated hydrochloric acid or sulfuric acid is added to the solution the free acid precipitates out and can be isolated.

Starting compounds of the formula (17) are the following: 4-methyl-2,6-dihydroxy-pyridine, 4-ethyl-2,6-dihydroxy-pyridine, 1,4-dimethyl-6-hydroxypyrid-2-one, 1-ethyl-4-methyl-6-hydroxy-pyrid-2-one, 1-ethyl-3-carbamoyl-4-methyl-6-hydroxy-pyrid-2-one, 1,4-dimethyl-3-carbamoyl-6-hydroxy-pyrid-2-one, 3-carbamoyl-4-methyl-2,6-dihydroxy-pyridine, 1-cyclohexyl-4-methyl-6-hydroxy-pyrid-2-one, 1-n-propyl-3-carbamoyl-4-methyl-6-hydroxy-pyrid-2-one, 1-ethyl-3-carbamoyl-4-(4'-methoxy-3'-sulfophenyl)-6-hydroxy-pyrid-2-one, 1-β-aminoethyl-4-methyl-6-hydroxy-pyrid-2-one, 1-phenyl-4-methyl-6-hydroxy-pyrid-2-one, 1-β-hydroxyethyl-4-methyl-6-hydroxy-pyrid-2-one, 1-isopropyl-4-methyl-6-hydroxy-pyrid-2-one, 4-methyl-5-carbamoyl-2,6-dihydroxy-pyridine, 2,6-dihydroxy-pyridine, 3-carbamoyl-4-ethyl-2,6-dihydroxy-pyridine, 1-cyclohexyl-3-carbamoyl-4-methyl-6-hydroxy-pyrid-2-one, 1-phenyl-3-carbamoyl-4-methyl-6-hydroxy-pyrid-2-one, 1-isopropyl-3-carbamoyl-4-methyl-6-hydroxy-pyrid-2-one, 1-ethyl-3-carbamoyl-4-sulfomethyl-6-hydroxy-pyrid-2-one, 4-sulfomethyl-2,6-dihydroxy-pyridine, 1-n-butyl-4-methyl-6-hydroxy-pyrid-2-one, 1,4-diethyl-6-hydroxy-pyrid-2-one, 1-ethyl-4-phenyl-6-hydroxy-pyrid-2-one, 1-n-butyl-3-carbamoyl-4-methyl-6-hydroxy-pyrid-2-one and 1-γ-isopropoxypropyl-4-methoxymethyl-6-hydroxy-pyrid-2-one.

Starting compounds of the formula (18) are: methanesulfonyl chloride, chloromethanesulfonyl chloride, trichloromethanesulfonyl chloride, ethanesulfonyl chloride, 2-chloroethanesulfonyl chloride, vinylsulfonyl chloride, vinylsulfonyl fluoride, 3-chloropropanesulfonyl chloride, 1-chlorobutane-3-sulfonyl chloride, 1-chlorobutane-4-sulfonyl chloride, allylsulfonyl chloride, benzylsulfonyl chloride, 4-nitrobenzylsulfonyl chloride, methanesulfonyl bromide, methanesulfonyl fluoride, bromomethanesulfonyl bromide, ethanesulfonyl bromide, ethanesulfonyl fluoride and perfluorobutylsulfonyl fluoride.

The coupling components of the formula (9), and thus also the azo dyes of the formula (1), can exist in several tautomeric forms. In order to simplify the description, these compounds are shown in only one of the tautomeric forms in the formulae. However, it is expressly emphasised that the description, here and also in the text which follows, especially in the claims, always relates to compounds in any of the tautomeric forms.

Aminoazo dyes into which the reactive radicals can be introduced after the coupling reaction are, for example, the coupling products of the abovementioned diazo components of the formula (8) with coupling components of the formula (9).

Acylating agents which, in addition to the acylating function, also contain a reactive radical are, in particular, the halides or anhydrides of organic acids which contain easily replaceable atoms or atom groupings.

Examples of such acylating agents are the following: chloro- or bromo-acetyl chloride, β-chloro- or β-bromo-propionyl chloride, α,β-dichloro- or α,β-dibromopropionyl chloride, chloromaleic anhydride, carbyl sulfate, acryl chloride, β-chloro- or β-bromo-acryl chloride, α-chloro- or α-bromo-acryl chloride, α,β-dichloro- or α,β-dibromo-acryl chloride, trichloroacryl chloride, chlorocrotonyl chloride, propiolic acid chloride, 3,5-dinitro-4-chlorobenzene-sulfonic acid chloride or -carboxylic acid chloride, 3-nitro-4-chlorobenzene-sulfonic acid chloride or -carboxylic acid chloride, 2,2,3,3-tetrafluorocyclobutane-1-carboxylic acid chloride, 2,2,3,3-tetrafluorocyclobutylacrylic acid chloride, β-chloroethylsulfonyl-endomethylene-cyclohexanecarboxylic acid chloride, acrylsulfonyl-endomethylene-cyclohexanecarboxylic acid chloride, 2-chlorobenzoxazolecarboxylic acid chlorides, 2-chlorobenzthiazole-carboxylic acid or -sulfonic acid chlorides, 4,5-dichloro-1-phenylpyridazone-carboxylic acid chloride or -sulfonic acid chloride, 4,5-dichloropyridazolepropionic acid chloride, 1,4-dichlorophthalazine-carboxylic acid chloride or -sulfonic acid chloride, 2,3-dichloroquinoxaline-carboxylic acid chloride or -sulfonic acid chloride, 2,4-dichloroquinazoline-carboxylic acid chloride or -sulfonic acid chloride, 2-methanesulfonyl-4-chloro-6-methylpyrimidine, 2,4-bis-methanesulfonyl-6-methylpyrimidine, 2,4,6-tri- or 2,4,5,6-tetra-chloropyrimidine, 2,4,6-tri- or 2,4,5,6-tetrabromopyrimidine, 2-methanesulfonyl-4,5-dichloro-6-methylpyrimidine, 2,4-dichloropyrimidine-5-sulfonic acid, 5-nitro- or 5-cyano-2,4,6-trichloropyrimidine, 2,6-bis-methanesulfonylpyridine-4-carboxylic acid chloride, 2,4-dichloro-5- chloromethyl-6-methyl-pyrimidine, 2,4-dibromo-5-bromomethyl-6-methyl-pyrimidine, 2,4-dichloro-5-chloromethylpyrimidine, 2,4-dibromo-5-bromomethylpyrimidine, 2,5,6-trichloro-4-methylpyrimidine, 2,6-dichloro-4-trichloromethylpyrimidine, 2,4-bis-methylsulfonyl-5-chloro-6-methylpyrimidine, 2,4,6-trimethylsulfonyl-1,3,5-triazine, 2,4-dichloropyrimidine, 3,6-dichloropyridazine, 3,6-dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromo-pyrimidine-4- or -5-carboxylic acid or -sulfonic acid amides or -4- or -5-sulfonic acid chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulfonic acid chloride, 5-nitro-6-methyl-2,4-dichloropyrimidine, 2,4,6-trichloro-5-bromopyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro- (-tribromo- or -trifluoro)-s-triazine and also 4,6-dichloro- (-dibromo- or -difluoro)-s-triazines which are substituted in the 2-position by an aryl or alkyl radical, for example a phenyl, methyl or ethyl radical, or by the radical of an aliphatic or aromatic mercapto compound bonded via the sulfur atom or of an aliphatic or aromatic hydroxy compound bonded via the oxygen atom, or especially by a —NH$_2$ group or by the radical of an aliphatic, heterocyclic or aromatic amino compound bonded via the nitrogen atom.

The 4,6-dihalogeno-s-triazines substituted in the 2-position are obtained, for example, by reacting trihalogeno-s-triazines with the said amino, hydroxy or mercapto compounds. The substituent in the 2-position of a 4,6-dihalogeno-s-triazine can be, for example, the radical of one of the amino, hydroxy and mercapto compounds named below.

Amino, hydroxy and mercapto compounds

Ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitroaniline, 2-nitro-4-methyl-aniline, 3-nitro-4-methylaniline, o-, m- and p-phenylenediamine, 3-amino-4-methylaniline, 4-amino-3-methyl-aniline, 2-amino-4-methylaniline, o-, m- and p-anisidine, o-, m- and p-phenetidine, 1-naphthylamine, 2-naphthylamine, 1,4-diaminonaphthalene, 1,5-diaminonaphthalene, 2-amino-1-hydroxy-naphthalene, 1-amino-4-hydroxy-naphthalene, 1-amino-8-hydroxy-naphthalene, 1-amino-2-hydroxy-naphthalene, 1-amino-7-hydroxy-naphthalene, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxy-benzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, 4, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzthiazole, 5-, 6- and 8-aminoquinoline, 2-aminopyrimidine, morpholine, piperidine, piperazine, water, methanol, ethanol, propanol, isopropanol, n-butanol, isobutanol, sec.-butanol, tert.-butanol, hexanol, cyclohexanol, β-methoxyethanol, β-ethoxyethanol, γ-methoxypropanol, γ-ethoxypropanol, β-ethoxy-β-ethoxyethanol, glycollic acid, phenol, o-, m- and p-chlorophenol, o-, m- and p-nitrophenol, o-, m- and p-hydroxybenzoic acid, o-, m- and p-phenosulfonic acid, phenol-2,4-disulfonic acid, α-naphthol, β-naphthol, 1-hydroxynaphthalene-8-sulfonic acid, 2-hydroxynaphthalene-1-sulfonic acid, 1-hydroxynaphthalene-5-sulfonic acid, 1-hydroxynaphthalene-4-sulfonic acid, 1-hydroxynaphthalene-6- or -7-sulfonic acid, 2-hydroxynaphthalene-6-, -7- or -8-sulfonic acid, 2-hydroxynaphthalene-4-sulfonic acid, 2-hydroxynaphthalene-4,8- or -6,8-disulfonic acid, 1-hydroxynaphthalene-4,8-disulfonic acid, 2-hydroxynaphthalene-3,6-disulfonic acid, methanethiol, ethanethiol, propanethiol, isopropanethiol, n-butanethiol, thioglycollic acid, thiourea, thiophenol, α-thionaphthol and β-thionaphthol.

Further suitable compounds are those having dye character, for example 4-nitro-4'-aminostilbenedisulfonic acid, 2-nitro-4'-aminodiphenylamino-4,3'-stilbenedisulfonic acid, 2-nitro-4'-aminodiphenylamine-4,3'-disulfonic acid and especially aminoazo dyes or aminoanthraquinones or phthalocyanines which also contain at least one reactive amino group.

The introduction of the substituent in the 2-position of the triazine radical can also be effected after the coupling reaction or after metallisation. Thus, for example, one of the abovementioned amino, hydroxy or mercapto compounds can subsequently be subjected to a condensation reaction with a dihalogeno-s-triazine radical already bonded to the azo dye of the formula (1). This possibility is also to be taken into consideration in the case of the process described further above for the preparation of the azo dyes of the formula (7) and others.

Further reactive radicals, in addition to those which can be introduced by acylation, are the vinylsulfonamide group, the β-sulfato- or -thiosulfato-ethylsulfonamide or β-thiosulfatopropionylamine group, the β-thiosulfatoethylsulfonylamide group or the sulfonic acid N,β-sulfatoethylamide group, which are introduced into the diazo component in a different manner, for example by forming an ester or thioester.

Further reactive compounds are those obtainable via corresponding methylols according to Einhorm, for example 1-amino-3-chloroacetylaminomethyl-benzene-6-sulfonic acid.

The acylation reactions with the fibre-reactive acylating agents are advantageously carried out using acid-binding agents, such as sodium carbonate or sodium hydroxide, and under conditions such that replaceable halogen atoms, unsaturated bonds or the like in the reactive radical still remain in the finished product, i.e. for example, in organic solvents or at relatively low temperatures in an aqueous medium.

What has been stated above with regard to the possibility of replacing a halogen atom in the s-triazine radical by an amino, alkoxy, aryloxy, alkylthio or arylthio group by reaction with an amino, hydroxy or mercapto compound can also apply in the case of other reactive radicals.

If a reactive radical still contains several easily detachable substituents, for example halogen atoms, it can be subjected to a condensation reaction with compounds which contain a reactive hydrogen atom which is bonded via a hetero-atom and is able to react with a detachable substituent of the reactive radical with the formation of a group bonded via the hetero-atom. Thus, it is possible to replace a chlorine atom in a trichloropyrimidine radical by means of reaction with ammonia or an amine, alcohol, phenol or mercaptan by one of the corresponding radicals.

Instead of subsequently replacing a halogen atom in a dihalogenotriazine radical by an amino, alkoxy, aryloxy, alkylthio or arylthio group, it is also possible to use, as the fibre-reactive acylating agent, a dihalogenotriazine which already contains an amino, alkoxy, aryloxy, alkylthio or arylthio group bonded to the triazine ring.

Further important azo dyes of the formula (1) are those which contain a monohalogenotriazine radical which is bonded via an amino group and contains, in addition to the halogen atom, an amino group bonded to the triazine ring, a further reactive radical, especially a halogenotriazine radical, being bonded to this amino group. If the second additional reactive radical is a halogenotriazine radical, it is preferably bonded to the first triazine radical via the radical of an alkylenediamine or arylenediamine. The fibre-reactive amino group present, in addition to the halogen atom, in the monohalogenotriazine radical thus preferably has the structure

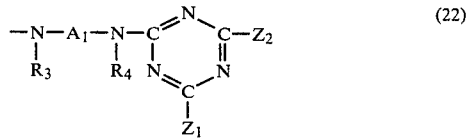

(22)

in which $R_3$ and $R_4$ are a hydrogen atom or alkyl having 1 to 4 carbon atoms, $A_1$ is an alkylene or arylene radical, $Z_1$ is a halogen atom, for example a fluorine, chlorine or bromine atom, and $Z_2$ is a halogen atom or an amino, alkoxy, aryloxy, alkylthio or arylthio group. $A_1$ can be an alkylene radical with a relatively short or relatively long chain, for example an ethylene or hexylene radical, but preferably $A_1$ is a benzene radical, for example a m- or p-phenylene radical and especially a phenylenesulfonic acid radical. An amino, alkoxy, aryloxy, alkylthio or arylthio group $Z_2$ is, for example, the radical of one of the abovementioned amino, hydroxy or mercapto compounds.

In a particular embodiment, $Z_2$ in formula (22) is the same as the chromogenic radical of the azo dye of the formula (1).

The condensation reactions of 2,4,6-trihalogeno-s-triazines with diazo components and/or coupling components and with amino, hydroxy and mercapto compounds are preferably carried out in aqueous solution or suspension, at low temperature and at a weakly acid or neutral to weakly alkaline pH value and so that a halogen atom still remains, as a detachable radical, on the triazine ring in the finished azo dye of the formula (1). Advantageously, the hydrogen halide liberated during the condensation reaction is neutralised continuously by the addition of aqueous alkali metal hydroxides, carbonates or bicarbonates.

If an azo dye of the formula (1) contains one or two α,β-dibromopropionyl radicals, these can be converted to α-bromoacryloyl radicals by treatment with agents which split off hydrogen halide, such as sodium hydroxide or triethylamine.

Depending on the starting materials chosen, it is also possible, according to the procedures described above, to prepare bis-reactive azo dyes of the formula (1) which contain two different reactive radicals, for example an α,β-dibromopropionyl radical and a 4,6-dichloro-s-triazin-2-yl radical.

The diazotisation of the diazo components of the formula (8) is as a rule effected by the action of nitrous acid in aqueous/mineral acid solution at low temperature and the coupling reaction with the coupling components of the formula (9) is carried out at weakly acid or neutral to weakly alkaline pH values.

If the radical D in formula (1) contains a complex-forming group, for example a hydroxyl or carboxyl group or an alkoxy group, such as a methoxy group, in the ortho-position relative to the azo group, the resulting azo dyes can (if desired before they are converted to reactive dyes or afterwards) be converted to their heavy metal complex compounds for example to the copper, chromium, nickel or cobalt complex compounds.

For this purpose, metal donors used are, for example, salts which contain the said metals as the cation, for example chromium sulfates, cobalt acetates, cobalt sulfate, copper sulfate or copper acetate. In some cases it is advantageous to use complex metal compounds, for example in the form of metal-ammine complexes, such as copper ammine sulfates obtained from copper sulfate and ammonia, pyridine or monoethanolamine, or in the form of compounds which contain one of the said metals in a complex bond with the anion, for example complex chromium compounds of organic hydroxycarboxylic acids, such as salicylic acid, or complex cobalt or copper compounds of the alkali metal salts of aliphatic aminocarboxylic acids or hydroxycarboxylic acids, such as of glycocol, lactic acid and, in particular, tartaric acid, such as sodium copper tartrate.

The treatment with the metal donors can be carried out according to methods known per se, for example at room temperature or at moderately elevated temperature, if the starting dyes are easily metallisable or, if a dealkylation has to take place at the same time as the metallisation, by warming to temperatures of between 50° and 120° C. in an open vessel, for example with reflux cooling, or, if desired, in a closed vessel under pressure, the pH conditions being determined by the nature of the metallisation process chosen; for example acid coppering with copper sulfate or alkaline coppering with copper tetramine sulfate. If desired, solvents, for example alcohol, dimethylformamide and the like, can also be added during the metallisation.

The metal complex compounds obtainable can contain one atom of metal bonded as a complex to one or two azo dye molecules. When copper compounds and nickel compounds are used as the metal donors, the compounds formed are, for example, preferably those which contain one atom of metal per one azo dye molecule, whilst when chromium is used, and in particular when cobalt is used, the 1:2 types are readily accessible and particularly valuable.

Instead of using o,o'-dihydroxyazo dyes as the starting materials, the corresponding o-alkoxy-o'-hydroxyazo dyes can also be used as starting materials; in this case, the alkyl group of the o-alkoxy radical is detached during metallisation and the metal complexes obtained are the same as those obtained from the o,o'-dihydroxy dyes.

The azo dyes of the formula (1) and their heavy metal complexes are novel; they are suitable for dyeing and printing very diverse materials, for example silk, leather, wool, synthetic fibers made of high-molecular weight polyamides or high-molecular weight polyurethanes, and polyhydroxylated materials, for example cellulose-containing materials having a fibrous structure, such as linen, cellulose, regenerated cellulose, cotton and the like.

The azo dyes of the formula (1) which contain a reactive radical are preferably used for dyeing nitrogen-containing fibres, for example high-molecular weight polyamides, high-molecular weight polyurethanes, silk, leather and, in particular, wool, for example from a weakly acid, neutral or weakly alkaline bath, if desired with the addition of the conventional assistants, for example the condensation products of ethylene oxide and high-molecular amines, and in particular cellulose materials, especially cotton, for example by the exhaustion process from a long liquor, from an alkaline, aqueous bath which can have a high salt content, and especially by the pad dyeing process, according to which the goods are impregnated with aqueous dye solutions, which can also contain salts, and the dyes are fixed after an alkali treatment or in the presence of alkali, if necessary under the action of heat.

The reactive dyes are also suitable for printing, especially on cotton, but are likewise also suitable for printing nitrogen-containing fibres, for example wool, silk or mixed fabrics containing wool.

The dyeings and prints are distinguished by interesting and valuable, very clear and brilliant shades. The dyeings and prints have good stability to acid and alkali and also good stability to synthetic resin finishes, good fastness to light and, especially on cotton, outstanding wet fastness properties. The high degree of fixation and the easy removability of non-fixed portions of dye are also worthy of mention.

In order to improve the wet fastness properties it is advisable to subject the dyeings and prints obtained to thorough rinsing with cold and hot water, if necessary with the addition of an agent which acts as a dispersant and promotes the diffusion of the non-fixed portions.

In the following examples parts are by weight unless stated otherwise, percentages are by weight and the temperatures are in degrees Centigrade. The relationship between parts by weight and parts by volume is the same as that between gram and cubic centimeter.

EXAMPLE 1

30 parts of 10 N hydrochloric acid and 25 parts of 4 N sodium nitrite solution are added to an ice-cold neutral solution of 23.0 parts of 3-aminoacetanilide-4-sulfonic acid in 200 parts of water. A solution of 29.6 parts of the sodium salt of 1-ethyl-3-carbamoyl-4-methyl-5-methylsulfonyl-6-hydroxy-pyrid-2-one in 300 parts of water is then added to the suspension of the diazo compound. The pH of the coupling mixture is adjusted to 7.5 by dropwise addition of about 90 parts of 2 N sodium hydroxide solution.

On the following day, the dye formed is filtered off and washed with saturated sodium chloride solution. In order to detach the acetyl group, the dye which has been isolated is warmed with 500 parts of 2 molar sulfuric acid at 90°-95° for 5 hours. After cooling, the dye of the formula

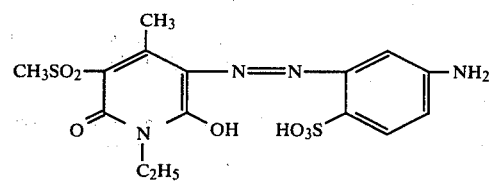

is filtered off and washed with saturated sodium chloride solution.

8.6 parts of the above dye are suspended in 150 parts of water and the pH is adjusted to 7 with 10 N sodium hydroxide solution. The suspension is cooled to 0°-5° and a solution of 3.7 parts of cyanuric chloride in 20 parts of acetone is added. Dropwise addition of 1 N sodium hydroxide solution is started after 15 minutes and the pH is adjusted to 7. About 20 parts of 1 N sodium hydroxide solution are required for this. 8 parts of 25% ammonia are then added to the clear solution of the dichlorotriazine dye and the mixture is warmed at 40°-45° for 3 hours. The aminochlorotriazine dye of the formula

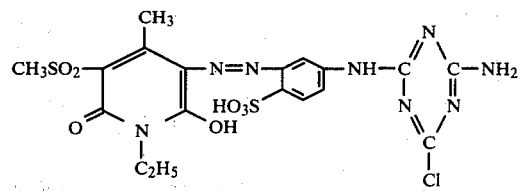

which has formed is salted out with 20% by volume of a mixture of sodium chloride and potassium chloride (1:1). filtered off and dried in vacuo at 50°.

The dye thus obtained dyes cotton in yellow shades.

Similar dyes are obtained when corresponding amounts of the following pyridone coupling components are used in Example 1 in place of 1-ethyl-3-carbamoyl-4-methyl-5-methylsulfonyl-6-hydroxy-pyrid-2-one: 1-ethyl-3-carbamoyl-4-methyl-5-ethylsulfonyl-6-hydroxy-pyrid-2-one, 1-n-propyl-3-carbamoyl-4-methyl-5-methylsulfonyl-6-hydroxy-pyrid-2-one, 1-methyl-4-methyl-5-phenyl-sulfonyl-6-hydroxy-pyrid-2-one, 1-ethyl-3-carbamoyl-4-isopropyl-5-methylsulfonyl-6-hydroxy-pyrid-2-one and 1-ethyl-4-ethyl-5-methylsulfonyl-6-hydroxy-pyrid-2-one.

Further fibre-reactive azo dyes are obtained in the same way as described in Example 1 when the aminoazo dyes in column I in the following table are acylated with the reactive components of column II; the resulting reactive dyes dye cotton in the shades indicated in column III.

| I | II | III |
|---|----|-----|
| 1-Ethyl-3-methylsulfonyl- | Tetrachloropyrimidine | yellow |

-continued

| I | II | III |
|---|---|---|
| 4-methyl-5-(2'sulfo-5'-amino-phenylazo)-6-hydroxy-pyrid-2-one | | |
| 1-Ethyl-3-methylsulfonyl-4-methyl-5-(2',5'-disulfo-4'-aminp-phenylazo)-6-hydroxy-pyrid-2-one | 2,4,6-Trifluoro-5-chloro-pyrimidine | golden-yellow |
| 1-Ethyl-3-methylsulfonyl-4-methyl-5-(2',4'-disulfo-5'-amino-phenylazo)-6-hydroxy-pyrid-2-one | 2-(2-40 -Sulfophenyl-amino)-4,6-difluoro-s-triazine | yellow |
| 3-Methylsulfonyl-4-methyl-5-(2'-sulfo-5'-amino-phenylazo)-2,6-dihydroxy-pyridine | 2-(3'-Sulfophenyl-amino)-4,6-dichloro-s,triazine | yellow |
| 3-Methylsulfonyl-4-methyl-5-(2'-sulfo-5'-amino-phenylazo)-2,6-dihydroxy-pyridine | 2,3-Dichloroquinoxaline-6-carboxylic acid chloride | yellow |
| 3-Methylsulfonyl-4-methyl-5-(2'-sulfo-5'-amino-phenylazo)-2,6-dihydroxy-pyridine | 2-Methylsulfonyl-4-methyl-5,6-dichloro-pyrimidine | yellow |
| 3-Methylsulfonyl-4-methyl-5-(2',5'-disulfo-4'-amino-phenylazo)-2,6-dihydroxy-pyridine | 2-Isopropoxy-4,6-dichloro-s-triazine | golden-yellow |
| 3-Methylsulfonyl-4-methyl-5-(2',5'-disulfo-4'-amino-phenylazo)-2,6-dihydroxy-pyridine | 2-Amino-4,6-difluoro-s-triazine | golden-yellow |
| 1-n-Butyl-3-methylsulfonyl-4-methyl-5-(2'-sulfo-5'-amino-phenylazo)-6-hydroxy-pyrid-2-one | 2,4,6-Trifluoro-5-chloro-pyrimidine | yellow |
| 1-n-Butyl-3-methylsulfonyl-4-methyl-5-(2',5'-disulfo-4'-amino-phenylazo)-6-hydroxy-pyrid-2-one | 2-Amino-4,6-difluoro-s-triazine | golden yellow |
| 1.4-Dimethyl-3-ethylsulfonyl-5-(2',5'-disulfo-4'-amino-phenylazo)-6-hydroxy-pyrid-2-one | Cyanuric chloride | golden yellow |
| 1,4-Diethyl-3-methylsulfonyl-5-(2'-sulfo-5'-amino-phenylazo)-6-hydroxy-pyrid-2-one | Tetrachloro-pyridazine | yellow |
| 3-Methylsulfonyl-4-ethyl-5-(2',5'-disulfo-4'-amino-phenylazo)-2,6 dihydroxy-pyridine | 2-Methoxy-4,6-dichloro-5-triazine | golden yellow |

EXAMPLE 2

A neutral solution of 4.46 parts of 2-aminonaphthalene-6-sulfonic acid is added, at room temperature, to a neutral solution of 11.56 parts of the dichlorotriazine dye of the formula

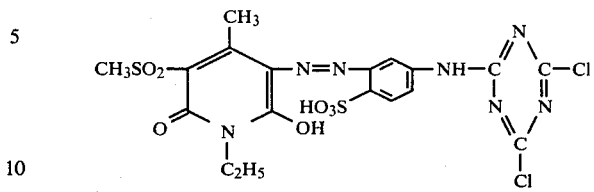

the preparation of which has been described in Example 1, the mixture is warmed slowly to 40°–45° and during the condensation reaction the pH is kept between 6 and 7 using 1 N sodium hydroxide solution.

After the condensation reaction has taken place, the dye of the formula

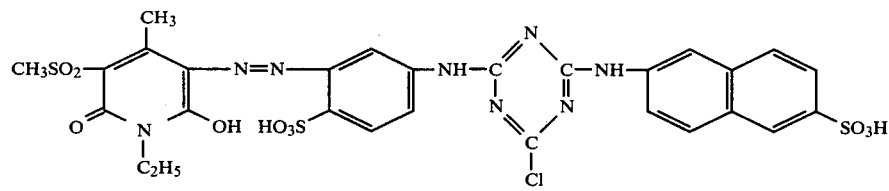

which has formed is salted out with 20% by volume of a mixture of sodium chloride and potassium chloride (1:1), filtered off and dried in vacuo at 50°.

The dye thus obtained dyes cotton in yellow shades.

A similar dye is obtained when a corresponding amount of metanilic acid is used in place of 2-aminonaphthalene-6-sulfonic acid.

EXAMPLE 3

8.6 parts of the dye of the formula

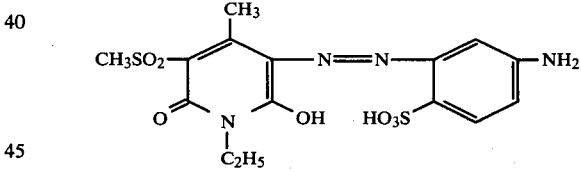

the preparation of which has been described in the first part of Example 1, are suspended in 200 parts of water and the pH is adjusted to 7 with 10 N sodium hydroxide solution. 4.16 parts of isopropoxydichlorotriazine are added to the suspension and the resulting mixture is warmed to 40°–45°. The pH is kept at 6–7 by the dropwise addition of 1 N sodium hydroxide solution. About 20 parts of 1 N sodium hydroxide solution are required for this. The resulting dye of the formula

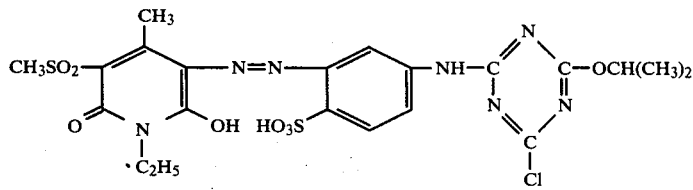

is salted out from the clear solution using 10% by volume of a mixture of sodium chloride and potassium chloride (1:1) and is filtered off and dried in vacuo at 50° C.

The dye thus obtained dyes cotton in yellow shades.

EXAMPLE 4

A solution of 9.3 parts of cyanuric chloride in 50 parts of acetone is added to an ice-cold, neutral solution of 8.65 parts of metanilic acid in 200 parts of water and the hydrochloric acid liberated is neutralised with about 25 parts of 2 N sodium hydroxide solution.

The clear solution of the primary condensation product is then poured into an ice-cold, neutral solution of 13.4 parts of 1,4-phenylenediamine-2,5-disulfonic acid in 200 parts of water. The temperature is allowed to rise to room temperature and the pH of the reaction mixture is kept at 6-7 using about 25 parts of 2 N sodium hydroxide solution. After the reaction is complete, the solution of the secondary condensation product is cooled to 0°-5° and diazotised with 25 parts of 2 N sodium nitrite solution and 13 parts of 10 N hydrochloric acid. A solution of 14.8 parts of the sodium salt of 1-ethyl-3-carbamoyl-4-methyl-5-methylsulfonyl-6-hydroxy-pyrid-2-one in 200 parts of water is then added to the resulting suspension of the diazo compound and the pH of the coupling mixture is adjusted to 7.5.

On the following day, the dye of the formula

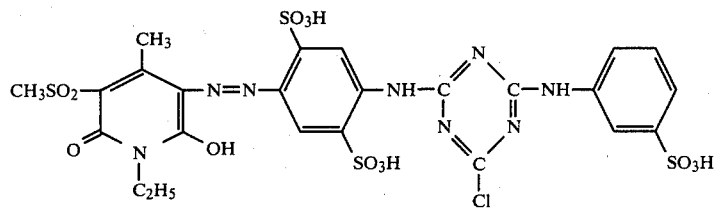

which has formed is filtered off with suction and dried in vacuo at 50°.

The dye thus obtained dyes cotton in golden yellow shades.

EXAMPLE 5

20.8 parts of isopropoxydichlorotriazine are added at room temperature to a neutral solution of 26.8 parts of 1,4-phenylenediamine-2,5-disulfonic acid and during the condensation reaction the pH is kept at 4.5-5.5 using 2 N sodium hydroxide solution, about 50 parts of 2 N sodium hydroxide solution being required for this. After 1 hour the pH of the solution is adjusted to 7 and the solution is cooled to 0°-5° and diazotised with 22 parts of 10 N hydrochloric acid and 25 parts of 4 N sodium nitrite solution. A solution of 29.6 parts of the sodium salt of 1-ethyl-3-carbamoyl-4-methyl-5-methylsulfonyl-6-hydroxy-pyrid-2-one in 200 parts of water is then added to the clear solution of the diazo component and the pH of the coupling mixtur is adjusted to 7.5 with 2 N sodium hydroxide solution.

On the following day the dye of the formula

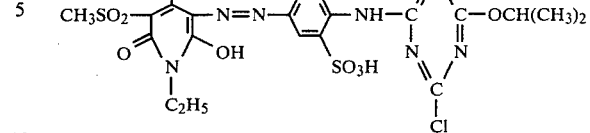

which has formed is filtered off and dried in vacuo at 50°.

The dye thus obtained dyes cotton in golden yellow shades.

EXAMPLE 6

11 parts of sodium bicarbonate and 100 parts of ice are added to an ice-cold, neutral solution of 26.8 parts of 1,4-phenylenediamine-2,5-disulfonic acid. 13.5 parts of cyanuric fluoride are allowed to run dropwise into this solution in the course of 30 minutes. After the reaction has taken place, a neutral solution of 17.3 parts of metanilic acid in 60 parts of water is added to the solution of the primary condensation product, the temperature is allowed to rise to room temperature and, during the second condensation reaction, the pH is kept between 6.5 and 7.0 by the dropwise addition of 10 N sodium hydroxide solution.

The solution of the secondary condensation product is then cooled to 0°-5° and 25 parts of 10 N hydrochloric acid and 25 parts of 4 N sodium nitrite solution are added. A solution of 29.6 parts of the sodium salt of 1-ethyl-3-carbamoyl-4-methyl-5-methylsulfonyl-6-hydroxy-pyrid-2-one in 200 parts of water is then added to the clear solution of the diazo component and the pH of the coupling mixture is adjusted to 7.5.

The dye of the formula

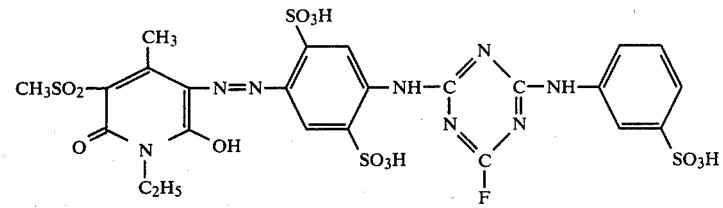

which has formed is salted out with sodium chloride on the following day and filtered off, buffered with 1 part of disodium hydrogen phosphate and dried in vacuo at 40°.

The dye thus obtained dyes cotton in golden yellow shades.

EXAMPLE 7

A neutral solution of 9.4 parts of 1,4-phenylenediamine-2-sulfonic acid is added at room temperature to a neutral solution of 28.9 parts of the dichlorotriazine dye of the formula

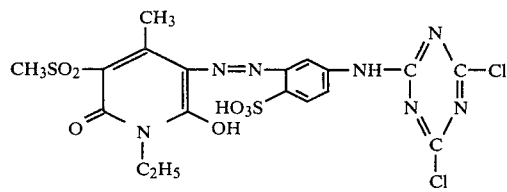

the preparation of which has been described in Example 1, and the pH is kept between 6 and 7 by dropwise addition of about 50 parts of 1 N sodium hydroxide solution.

The resulting condensation produce is then salted out with 20% by volume potassium chloride and filtered off.

The intermediate dye isolated is dissolved in 300 parts of water, the solution is cooled to 0°–5° and a solution of 9.3 parts of cyanuric chloride in 50 parts of acetone is added. Dropwise addition of 1 N sodium hydroxide solution is started after 15 minutes and the pH is adjusted to 7. After the acylation has taken place, 30 parts or 25% ammonia are added to the reaction mixture and the resulting mixture is warmed at 40°–45° for 3 hours.

The dye of the formula

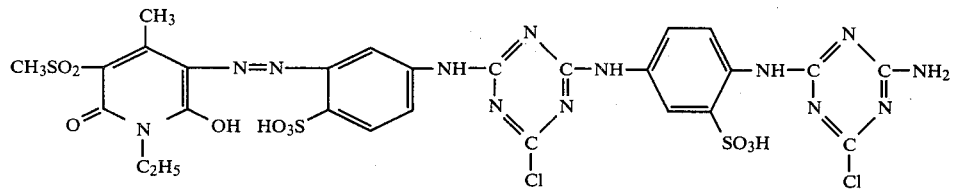

which is formed is salted out with 10% by volume potassium chloride, filtered off and dried in vacuo at 50°.

The dye thus obtained dyes cotton in yellow shades.

EXAMPLE 8

24 parts of 2,5-dichloroaniline-4-sulfonic acid are dissolved in hot water and precipitated as a suspension with 25 parts by volume of 10 N hydrochloric acid. The suspension is diazotised at 0° to 15° with 100 parts by volume of 1 N sodium nitrite solution. After 30 minutes a slight excess of nitrite is destroyed with sulfamic acid.

28 parts of 1-ethyl-3-methylsulfonyl-4-methyl-5-carbamoyl-6-hydroxypyrid-2-one, in the form of the sodium salt, are dissolved in water with warming and the solution is cooled and poured at 0° to 15° into the above diazo suspension. The pH value of the mixture is kept at 7 to 8 for 3 hours by adding sodium hydroxide solution. The dye precipitates as a precipitate which can be filtered off easily and this precipitate is filtered off and washed with dilute sodium chloride solution. After drying in vacuo at 50° to 60° this yields 34 parts of the dye of the formula

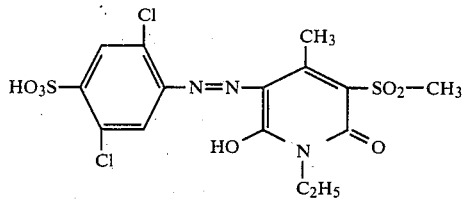

which dyes wool and polyamide fibres in reddish-tinged yellow shades.

Coupling the diazo components indicated in column I of the following table in an analogous manner with 1-ethyl-3-methylsulfonyl-4-methyl-5-carbamoyl-6-hydroxypyrid-2-one yields further dyes which dye wool and polyamide fibres in the shades indicated in column II.

| I<br>Diazo Component | II<br>Colour shade |
|---|---|
| 1-Aminobenzene-2-sulfonic acid | yellow |
| 1-Amino-2-chlorobenzene-5-sulfonic acid | greenish-tinged yellow |
| 1-Amino-4-chlorobenzene-2-sulfonic acid | greenish-tinged yellow |
| 1-Amino-2-carboxybenzene-4-sulfonic acid | yellow |
| 1-Amino-3-benzoylaminobenzene-2-sulfonic acid | greenish-tinged yellow |
| 1-Amino-4-methoxybenzene-2-sulfonic acid | golden yellow |

Further dyes are obtained by the procedure described in Example 8 by coupling the diazo components of column I of the following table with 3-methylsulfonyl-4-methyl-2,6-dihydroxy-pyridine; the resulting dyes dye wool and polyamide in the shades indicated in column II.

| I<br>Diazo component | II<br>Colour shade |
|---|---|
| 1-Amino-2,5-dichlorobenzene-4-sulfonic acid | yellow |
| 1-Amino-4-methoxy-benzene-2-sulfonic acid | golden yellow |
| 1-Amino-4-benzoylamino-benzene-2-sulfonic acid | orange |
| 2-Aminonaphthalene-1-sulfonic acid | greenish-tinged yellow |
| 1-Amino-2-(2'-sulfo-4'-chlorophenoxy)-5-chlorobenzene | golden yellow |
| 1-Amino-2-(4'-methyl-phenyl-sulfonyl)-benzene-5-sulfonic acid | yellow |
| 1-Amino-4-(α-bromoacryl-amino)-benzene-2-sulfonic acid | reddish-tinged yellow |
| 1-Amino-5-(α-bromoacryl-amino)-benzene-2-sulfonic acid | orange |

The azo dyes listed in column I of the following table are prepared by the procedure of Example 8 and these are reacted, as indicated in column II, with chromium donors or cobalt donors. This yields metal complex azo dyes which dye wool and polyamide in the shades indicated in column III.

| I<br>Azo dye | II<br>Me | III<br>Colour shade |
|---|---|---|
| 1-Amino-2-hydroxy-5-chlorobenzene-3-sulfonic acid → 3-Methylsulfonyl-4-methyl-2,6-dihydroxy-pyridine | Cr/2 | bluish-tinged red |
| 1-Amino-2-hydroxy-5-chlorobenzene-3-sulfonic acid → 3-Methylsulfonyl-4-methyl-2,6-dihydroxy-pyridine | Co/2 | scarlet |
| 1-Amino-2-hydroxy-3-nitrobenzene-5-sulfonic acid → 3-Methylsulfonyl-4-methyl-2,6-dihydroxy-pyridine | Cr/2 | red |
| 1-Amino-2-hydroxy-3-nitro-benzene-5-sulfonic acid → 3-Methylsulfonyl-4-methyl-2,6-dihydroxy-pyridine | Co/2 | red |

EXAMPLE 9

80.4 parts of 5-α,β-dibromopropionylamino-aniline-2-sulfonic acid are stirred into 1,000 parts by volume of an ice/water mixture and diazotised at 0° to 20° with 200 parts by volume of 1 N sodium nitrite solution. After 3 to 4 hours the diazotisation has ended and a slight excess of nitrite is destroyed with sulfamic acid.

55 parts of 1-ethyl-3-methylsulfonyl-4-methyl-5-carbamoyl-6-hydroxypyrid-2-one, in the form of the sodium salt, are dissolved in water with warming and the resulting solution is cooled and poured at 0° to 10° into the above diazo suspension. The pH value of the mixture is kept at 7 to 8 for 4 hours by adding sodium hydroxide solution. The dye which has precipitated is filtered off and dried in vacuo at 50° to 60°. 120 parts of the dye of the formula

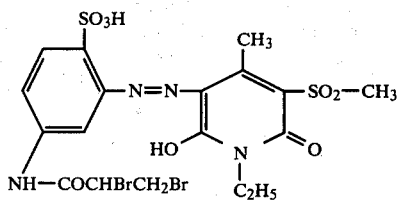

are obtained; this dye dyes wool and polyamide fibres in brilliant greenish-tinged yellow shades.

Coupling the diazo components indicated in column I of the following table in an analogous manner with 1-ethyl-3-methylsulfonyl-4-methyl-5-carbamoyl-6-hydroxypyrid-2-one yields further dyes which dye wool and polyamide fibres in the shades indicated in column II.

| I<br>Diazo component | II<br>Colour shade |
|---|---|
| 1-Amino-3-α,β-dibromopropionylaminobenzene-4,6-disulfonic acid | greenish-tinged yellow |
| 1-Amino-4-α,β-dibromopropionylaminobenzene-2,5-disulfonic acid | golden yellow |
| 1-Amino-3-(2',6'-dichloro-5'-methylsulfonyl-pyrimidyl-4')-amino-benzene-6-sulfonic acid | yellow |
| 1-Amino-4-methoxy-5-α,β-dibromopropionyl-aminomethyl-benzene-6-sulfonic acid | golden yellow |
| 1-Amino-3-(2',6'-difluoro-5'-chloro-pyrimidyl-4')-amino-benzene-6-sulfonic acid | yellow |

EXAMPLE 10

29.2 parts of 1-amino-4-benzoylaminobenzene-2-sulfonic acid are suspended in 1,500 parts of water and the pH value of the suspension is adjusted to 7.5 to 8 with sodium hydroxide solution. 100 parts of 1 N sodium nitrite solution are added to the solution and the solution is then allowed to run dropwise into a mixture of 1,000 parts of ice and 50 parts of 30% hydrochloric acid. The resulting diazo suspension is poured into a solution of 25 parts of 1-ethyl-3-methyl-sulfonyl-4-methyl-6-hydroxy-pyrid-2-one and 60 parts of sodium bicarbonate in 500 parts of water. The coupling mixture is kept at a pH value of 7 to 8.5 for 10 hours. The dye formed is filtered off and washed with 5% sodium chloride solution. After drying in vacuo at 50° to 60°, this yields 66 parts of the dye of the formula

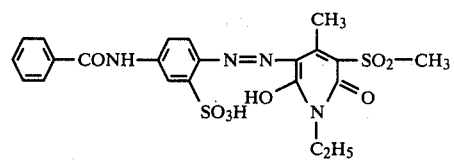

which dyes wool and polyamide fibres in brilliant golden yellow shades.

EXAMPLE 11

78.5 parts of 1-ethyl-3-carbamoyl-4-methyl-6-hydroxy-pyrid-2-one are suspended in 1,000 parts of water and the pH of the suspension is adjusted to 12 with 10 N sodium hydroxide solution. A clear solution forms and this is cooled to about 5°. 92 parts of methanesulfonyl chloride are allowed to run in dropwise in the course of 1 hour at 5° to 10°, the pH of the reaction mixture being kept at 12 by adding 10 N sodium hydroxide solution at the same time. The ice-cooling is then removed and the reaction mixture is kept at room temperature for a further 3 to 5 hours.

The reaction product is salted out from the clear solution by adding 20% by volume sodium chloride and is filtered off and washed with brine.

For further purification the crude product is again dissolved in 1,000 parts of water and again salted out by adding 200 parts of sodium chloride. After filtering off and drying in vacuo at 80° this yields about 80 parts of the monosodium salt of 1-ethyl-3-carbamoyl-4-methyl-5-methylsulfonyl-6-hydroxy-pyrid-2-one in the form of a white powder.

| $C_{10}H_{13}N_2O_5SNa$ (molecular weight: 296) | |
|---|---|
| Calculated: | Found: |
| 40.6% C | 39.6% C |
| 4.4% H | 4.4% H |
| 9.5% N | 9.4% N |
| 10.8% S | 10.6% S |

If an aqueous solution of the sodium salt is acidified with hydrochloric acid the free acid can then be isolated in the form of fine small needles.

After recrystallisation from water, the new product melts at 169° to 170°.

| $C_{10}H_{14}N_2O_5S$ (molecular weight 274) | |
|---|---|
| Calculated: | Found: |
| 43.8% C | 43.9% C |
| 5.2% H | 5.2% H |
| 10.2% N | 10.2% N |
| 11.7% S | 12.2% S. |

EXAMPLE 12

27 parts of 1-ethyl-3-methylsulfonyl-4-methyl-5-carbamoyl-6-hydroxypyrid-2-one are introduced into 630 parts of 70% sulfuric acid at 100°. The resulting solution is warmed at 130° for 2 hours, during which time carbon dioxide escapes, and is then poured onto 2,400 parts of ice. The crystalline precipitate formed is filtered off and washed with 250 parts of distilled water. After drying at room temperature, 20 parts of the compound of the formula

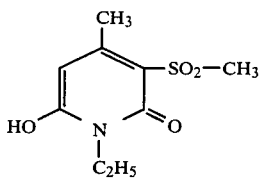

are obtained. In the coupling titer 466 mg of this compound consume 38 ml of 0.05 N diazo-p-nitroaniline solution; this corresponds to a purity of 94%. The compound of the formula indicated above has a melting point of 88° to 91°.

DYEING EXAMPLE 1

2 parts of the dye obtained according to Example 1 are dissolved in 100 parts of water at 20° to 50° with the addition of 5 to 20 parts of urea and 2 parts of calcined sodium carbonate. A cotton fabric is impregnated with the resulting solution so that its weight increases by 60 to 80% and is then dried. Thermofixing is then carried out for ½ to 5 minutes at 140° to 210° and the fabric is then soaped for a quarter of an hour in a 0.1% boiling solution of an ion-free detergent, rinsed and dried.

DYEING EXAMPLE 2

2 parts of the dye obtained according to Example 1 are dissolved in 2,000 parts of water at 75° with the addition of 120 parts of sodium chloride or calcined Glauber's salt. 100 parts of a cotton fabric are introduced into this dyebath and the temperature is kept constant for 30 to 60 minutes. 10 parts of calcined sodium carbonate and 4 ml of sodium hydroxide solution (36° Bé) are then added. The temperature is kept at 75° to 80° for a further 45 to 60 minutes and the fabric is then soaped for 15 minutes in a 0.1% boiling solution of an ion-free detergent, rinsed and dried.

DYEING EXAMPLE 3

2 parts of the dye obtained according to Example 7 are dissolved in 100 parts of water with the addition of 0.5 parts of sodium m-nitrobenzenesulfonate. A cotton fabric is impregnated with the resulting solution so that its weight increases by 75% and is then dried.

The fabric is then impregnated with a solution which is at 20° and contains, per liter, 5 grams of sodium hydroxide and 300 grams of sodium chloride and squeezed off to an increase in weight of 75% and the dyeing is steamed for 30 seconds at 100° to 101°, rinsed, soaped for a quarter of an hour in a 0.3% boiling solution of an ionfree detergent, rinsed and dried.

DYEING EXAMPLE 4

2 parts of the dye obtainable according to Example 7 are dissolved in 100 parts of water.

The solution is added to 1,900 parts of cold water, 60 parts of sodium chloride are added and 100 parts of a cotton fabric are introduced into this dyebath.

The temperature is raised at 60° and after 30 minutes 40 parts of calcined sodium carbonate and a further 60 parts of sodium chloride are added. The temperature is kept at 60° for 30 minutes and the dyeing is then rinsed and soaped for 15 minutes in a 0.3% boiling solution of an ion-free detergent, rinsed and dried.

DYEING EXAMPLE 5

10 parts of wool flannel are introduced, at 40°, into a bath which contains, in 500 parts of water, 0.5 part of Glauber's salt, 0.4 part by volume of acetic acid and 0.2 part of the dye according to Example 8. The temperature is raised to the boil at a uniform rate in the course of 30 minutes and the wool flannel is dyed for a further one hour at the boil. The dyed goods are then rinsed and finished in the customary manner. A very level, clear yellow dyeing is obtained.

When the same amount of sulfuric acid is used in place of acetic acid and dyeing is carried out as indicated in the example, a yellow dyeing with the same characteristics is obtained.

DYEING EXAMPLE 6

10 parts of a synthetic polyamide fabric are introduced at 40° into a dyebath which contains, in 500 parts of water, 0.40 part of 40% acetic acid, 0.25 part of the sulfonate of butyl ricinoleate and 0.20 part of the dye of Example 8. The temperature is raised to the boil at a uniform rate in the course of 30 minutes and dyeing is carried out for a further one hour with gentle boiling. The fabric is then rinsed and dried. A level, streak-free yellow dyeing is obtained which has good fastness to washing and to light.

DYEING EXAMPLE 7

1.5 parts of the dye obtainable according to Example 9 are dissolved in 4,000 parts of water and 4 parts of ammonium sulfate, 5 parts of crystalline sodium sulfate, 1 part of 80% acetic acid and 1 part of the oleylamine-/ethylene oxide adduct, the preparation of which is described below, are added. 100 parts of well wetted, chlorinated wool are introduced at 30° into the dyebath thus obtained. The dyebath is brought to the boil in the course of 30 minutes and dyeing is carried out at the boil for 50 minutes. The bath is then cooled to 80° and the pH value is adjusted to 8.5 by adding ammonia. The wool is dyed in this bath for a further 15 minutes. Finally, the wool is rinsed with cold water and dried. The wool has been dyed in brilliant yellow shades which are fast to washing and have good fastness to light.

Preparation of the ethylene oxide adduct:

1 part of finely divided sodium is added to 100 parts of technical grade oleylamine and the mixture is heated to 140°, after which ethylene oxide is passed in at 135° to 140°. As soon as ethylene oxide is taken up rapidly, the reaction temperature is lowered to 120° to 125° and the introduction of ethylene oxide is continued until 113 parts of ethylene oxide have been taken up. The reaction product thus obtainable is soluble in water to give a virtually clear solution.

PRINTING EXAMPLE 2 parts of the dye prepared according to Example 1 are sprinkled into 100 parts of a stock thickener containing 45 parts of 5% sodium alginate thickener, 32 parts of water, 20 parts of urea, 1 part of sodium m-nitrobenzenesulfonate and 2 parts of sodium carbonate, with rapid stirring.

Using the printing paste thus obtained, a cotton fabric is printed on a roller printing machine and the resulting printed material is steamed for 4 to 8 minutes at 100° in saturated steam. The printed fabric is then rinsed thoroughly in cold and hot water, by which means the portion not chemically fixed can be removed from the fibre very easily, and is then dried.

What is claimed is:

1. An azo dye of the formula

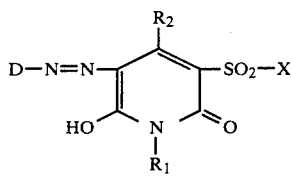

wherein D is a diazo component of the benzene or naphthalene series which contains a sulfonic acid group and a fiber-reactive radical, capable of reacting with the hydroxyl groups of cellulose or with the amino groups of natural or synthetic polyamides with the formation of covalent chemical bonds therewith, said fiber-reactive radical bonded to a ring carbon atom of D via an —N(R)—group, in which R is hydrogen or alkyl of 1 to 4 carbon atoms, a —CH$_2$—NH—bridge or an

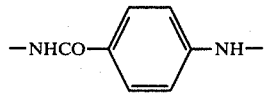

bridge, $R_1$ is hydrogen or an alkyl radical having 1 to 4 carbon atoms, $R_2$ is an alkyl radical having 1 to 4 carbon atoms and X is a substituted or unsubstituted alkyl or alkenyl radical.

2. An azo dye of claim 1, wherein D contains 1 to 3 sulfonic acid groups and zero to at least one substituent selected from the group consisting of methyl, chlorine, nitro, methoxy, ethoxy, phenoxy, hydroxyl, carboxyl, methoxycarbonyl, ethoxycarbonyl, acetyl, acetylamino, benzoylamino and carbamoyl, $R_1$ is a hydrogen atom or an alkyl radical having 1 to 4 carbon atoms, $R_2$ is an alkyl radical having 1 to 4 carbon atoms and X is an alkyl radical having 1 to 4 carbon atoms.

3. An azo dye of claim 2, wherein D is of the benzene series and contains 1 to 2 sulfonic acid groups and zero to at least one substituent selected from the group consisting of methyl, chlorine, methoxy, ethoxy, carboxyl, acetyl, acetylamino and benzoylamino, and $R_1$ is an alkyl radical having 1 to 4 carbon atoms.

4. An azo dye of claim 3, wherein $R_1$ is ethyl, $R_2$ is methyl and X is methyl.

5. An azo dye of claim 1, wherein D contains 1 to 3 sulfonic acid groups and zero to at least one substituent selected from the group consisting of methyl, chlorine, methoxy, ethoxy, carboxyl, acetylamino, benzoylamino, —NH$_2$, methylamino, ethylamino, phenylamino, ureido and hydroxyl; the fiber-reactive group is bonded to ring carbon atoms of D via an —N(R)—bridge; $R_1$ is a hydrogen atoms or an alkyl radical having 1 to 4 carbon atoms; $R_2$ is an alkyl radical having 1 to 4 carbon atoms; X is a substituted or unsubstituted alkyl or alkenyl radical; and R is hydrogen or alkyl having 1 to 4 carbon atoms.

6. An azo dye of claim 5, wherein D is of the benzene series and contains 1 to 2 sulfonic acid groups and zero to at least one of the substituents selected from the group consisting of methyl, chlorine, methoxy, ethoxy, carboxyl, acetylamino, benzoylamino, phenylamino and ureido, $R_1$ and $R_2$ independently of one another are each an alkyl radical having 1 to 4 carbon atoms, and X is alkyl radical having 1 to 4 carbon atoms.

7. An azo dye of claim 6, wherein $R_1$ is ethyl, $R_2$ is methyl and X is methyl.

8. An azo dye of claim 1, wherein D is of the benzene series and contains 1 to 2 sulfonic acid groups and zero to at least one of the substituents selected from the group consisting of methyl, chlorine, methoxy, ethoxy, carboxyl, acetylamino, benzoylamino, phenylamino and ureido, $R_1$ and $R_2$ independently of one another are each an alkyl radical having 1 to 4 carbon atoms, and X is an alkyl radical having 1 to 4 carbon atoms, wherein the fiber reactive group is bonded to a ring carbon atom of D via an —N(H)—or —CH$_2$NH—bridge, and wherein the fiber reactive group is selected from the group consisting of α,β-dibromopropionyl, α-bromoacryl, 2,6-dichloro-5-methylsulfonyl-pyrimid-4-yl, 2,6-difluoro-5-chloro-pyrimid-4-yl 2,4,5-trichloropyrimid-6-yl, 2,4-dichloro-s-triazin-6-yl, 2-chloro-4-amino-s-triazin-6-yl, 2-chloro-4-sulfophenylamino-s-triazin-6-yl, 2-chloro-4-sulfonaphthylamino-s-triazin-6-yl, 2-chloro-4-isopropoxy-s-triazin-6-yl, 2-fluoro-4-sulfophenylamino-s-triazin-6-yl, 2-chloro-4-[4'-(2,4-dichloro-s-triazin-6-ylamino)-3'-sulfo-phenylamino]-s-triazin-6-yl and 2-chloro-4-[4'-(2-chloro-4-amino-s-triazin-6-ylamino)-3'-sulfophenylamino]-s-triazin-6-yl radical, provided that the —CH$_2$NH—bridge is only selected when the fiber-reactive group is α,β-dibromopropionyl.

* * * * *

UNITED STATES PATENT AND TRADEMARK OFFICE
CERTIFICATE OF CORRECTION

PATENT NO. : 4,283,331
DATED : AUGUST 11, 1981
INVENTOR(S) : KARL SEITZ ET AL

It is certified that error appears in the above—identified patent and that said Letters Patent is hereby corrected as shown below:

Claim 5, Column 30, Line 19 reads:

"bridge; $R_1$ is a hydrogen atoms or an alkyl radical hav-"

Should read:

-- bridge; $R_1$ is a hydrogen atom or an alkyl radical hav- --

Signed and Sealed this

Twenty-ninth Day of December 1981

[SEAL]

Attest:

GERALD J. MOSSINGHOFF

Attesting Officer

Commissioner of Patents and Trademarks